Sept. 27, 1955 C. M. PHILLIPS 2,718,744
CUTTER ASSEMBLY WITH PNEUMATIC CONVEYING ATTACHMENT
Filed Aug. 23, 1954
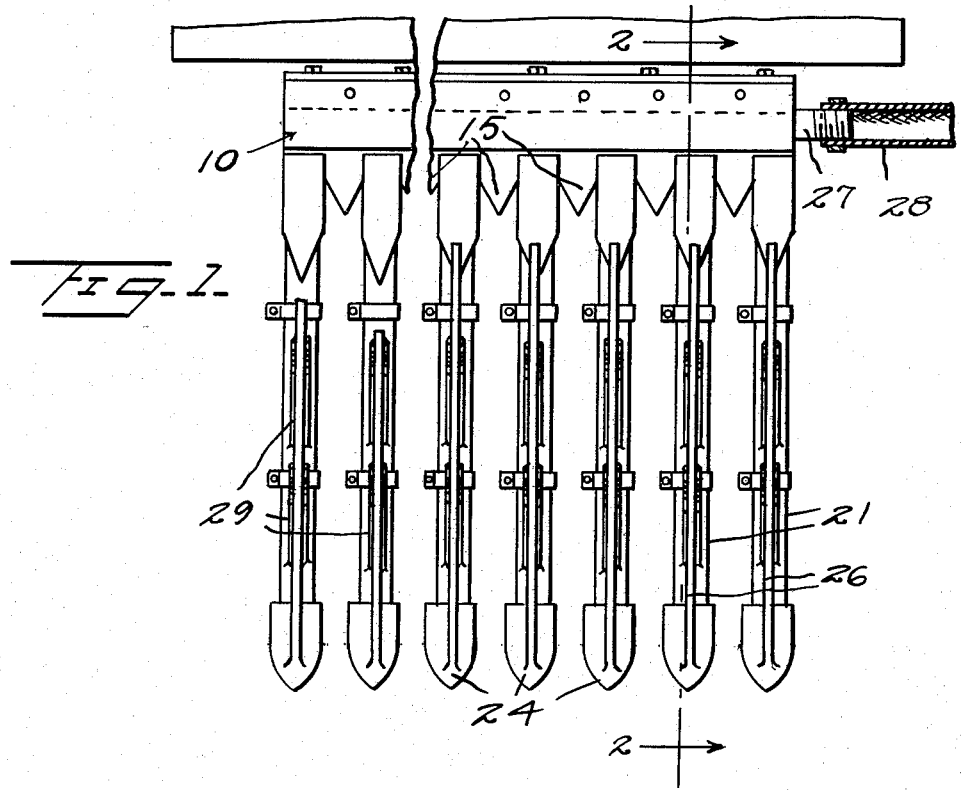
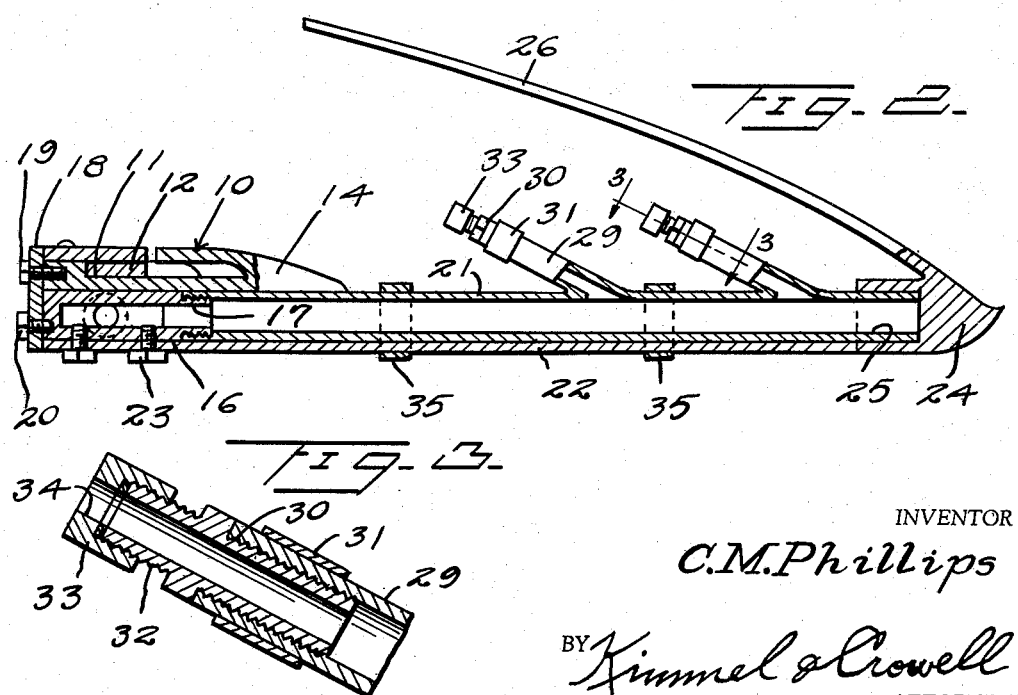
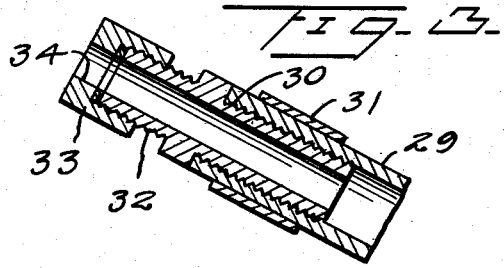
INVENTOR
C. M. Phillips
BY Kimmel & Crowell
ATTORNEYS

UNITED STATES PATENT OFFICE

2,718,744
CUTTER ASSEMBLY WITH PNEUMATIC CONVEYING ATTACHMENT

Curt M. Phillips, Rudyard, Mont.

Application August 23, 1954, Serial No. 451,479

5 Claims. (Cl. 56—158)

This invention relates to an improved windreel for grain harvesting machines.

In harvesting or combine machines at present available and in use, a rotary reel is used for knocking or forcing the grain rearwardly onto the cutter bar and onto the lateral conveyor. Where the grain is quite short, the reel will not normally touch the grain. If the reel is lowered to engage the short grain the reel will frequently strike rocks or the like, with the result that the beater bars will become broken. It is, therefore, an object of this invention to provide a non-rotatable means which extends from the cutter bar and is connected to a source of air pressure supply, whereby the grain being cut by the cutter bar will be blown rearwardly over the cutter bar onto the transverse conveyor.

Another object of this invention is to provide, as an attachment for a grain harvesting machine, a series of air nozzles disposed forwardly of the cutter bar and directed rearwardly. The nozzles are secured to a forwardly projecting shoe which is of resilient construction so that the shoe may flex upwardly when the forward end of the shoe strikes a rock or other obstruction.

A further object of this invention is to provide an attachment of this kind which can be mounted on various kinds and types of grain harvesting machines and will take the place of the rotary reel with the result that a greater yield of grain will be obtained irrespective of whether the crop is short, tall, thick or thin.

In the drawings:

Figure 1 is a fragmentary plan view of the cutter portion of a grain harvesting machine having an attachment mounted thereon constructed according to an embodiment of this invention;

Figure 2 is a sectional view taken on the line 2—2 of Figure 1; and

Figure 3 is an enlarged vertical section of one of the air nozzles, taken along the line 3—3 of Figure 2 looking in the direction of the arrows, with parts broken away.

Referring to the drawing, the numeral 10 designates generally a cutter member of conventional construction which is disposed on the front end of a grain harvesting machine. The cutter member 10 is formed of a stationary cutter bar 11 with a movable cutter bar 12 slidably mounted on the stationary bar 11. The stationary bar 11 is formed with forwardly projecting guards 14 which project beyond the forward ends of the cutter blades 15.

The cutter member 10 has mounted on the lower side thereof an elongated manifold 16 which is relatively flat in transverse section and is provided with a plurality of threaded nipples 17 extending from the forward side thereof. The manifold 16 is either formed integral with the stationary bar 11 or, as shown in Figure 2, secured thereto by means of a bar 18 secured by fastening means 19 to stationary member 11 and secured by fastening means 20 to the manifold 16. A flexible tubular member 21 is secured at its rear end on nipple 17 and projects forwardly of the cutter member 10. The flexible member 21 is disposed on the upper side of a resilient bar or shoe 22 which is secured by fastening means 23 to the lower side of the manifold 16. The forward end of the shoe 22 terminates in an upturned head 24 which is formed with a socket 25 within which the tubular member 21 engages. An upwardly and rearwardly directed guard rod or bar 26 extends from the head member 24 and terminates at a point closely adjacent the cutter member 10. The manifold 16 at one end thereof has a nipple 27 extending therefrom on which a flexible air supply hose 28 is secured. The supply hose 28 is connected to a source of air pressure supply (not shown) so that air under pressure may be discharged into the manifold 16. Each flexible member 21 has extending upwardly and rearwardly from the upper side thereof a pair of tubular nipples 29 in the upper rear end of which a threaded nipple 30 is secured. The nipple 30 is secured within the nipple 29 by means of a clamping band 31. The nipple 30 includes an outer threaded member 32 on which a cap 33 is mounted and the cap 33 is formed with a jet opening 34. It is contemplated that different jet openings be used for varying harvesting conditions, and interchangeable jet caps will be provided having jet openings of different sizes. The flexible member 21 is secured to the upper side of the shoe or resilient bar 22 by means of a pair of clamping bands 35.

In use and operation of this invention, the manifold 16 is secured to the lower side of the cutter member 10 and the flexible members 21 carried by the flexible supporting bars or shoes 22 will project forwardly of the cutter member 10. The usual rotary reel which is found on conventional harvesting or mowing machines will be removed and the assembly heretofore described will be secured to the cutter member 10. The flexible tube 28 is connected to a source of air pressure supply which is a blower operated from an independent power source or from the combine motor. As the machine moves forwardly, the grain will be cut by the movable cutter bar 12 and the cut grain will be blown rearwardly onto the conventional conveyor usually present in grain harvesting combines. In the event the nose 24 of the resilient support 22 should strike a rock or other obstruction, the bar 22 with the flexible tube 21 may flex upwardly until the machine passes over the rock or obstruction. With the nozzle assemblies having independent flexibility, each tubular member with the flexible shoe or support 22 may flex independently of adjacent shoes.

With a device as hereinbefore described, the cutter member 10 will cut the grain which is either short, tall, thick or thin and substantially all of the grain cut will be delivered rearwardly onto the conveyor for subsequent treatment in the conventional manner.

What is claimed is:

1. In a grain harvesting machine having a horizontal cutter member formed of a stationary bar and a movable bar, an elongated air manifold carried by the lower side of said stationary bar, a plurality of forwardly projecting resilient shoes fixed to said manifold, an upwardly and rearwardly projecting guard carried by each shoe, a tubular member overlying each shoe and communicating at the rear thereof with said manifold, and at least one rearwardly directed nozzle carried by said tubular member for directing an air stream rearwardly over said cutter member.

2. In combination a cutter member formed of a stationary cutter bar, a movable cutter bar, a manifold carried by and extending lengthwise of said stationary cutter bar, a plurality of air nozzles forwardly of said cutter member, said nozzles being directed rearwardly, flexible means connecting said nozzles with said manifold, and a flexible support for said flexible connecting means carried by said manifold.

3. An attachment for the cutter member of a grain harvesting machine comprising an elongated air manifold, means securing said manifold to the lower side of said cutter member, a plurality of forwardly extending flexible tubular members connected with said manifold, a pair of upwardly and rearwardly directed nozzles carried by each tubular member, and a flexible support for each of said flexible tubular members secured to said manifold.

4. An attachment for the cutter member of a grain harvesting machine comprising an elongated air manifold, means securing said manifold to the lower side of said cutter member, a plurality of flexible tubular members connected with said manifold, a pair of upwardly and rearwardly directed nozzles carried by each tubular member, a plurality of resilient bars fixed to said manifold and projecting forwardly beneath said tubular members, and means securing said tubular members to said bars.

5. An attachment for the cutter member of a grain harvesting machine comprising an elongated air manifold, means securing said manifold to the lower side of said cutter member, a plurality of flexible tubular members connected with said manifold, a pair of upwardly and rearwardly directed nozzles carried by each tubular member, a plurality of resilient bars fixed to said manifold and projecting forwardly beneath said tubular members, means securing said tubular members to said bars, and a rearwardly and upwardly extending guard carried by each resilient bar, said guards extending over said nozzles.

References Cited in the file of this patent

UNITED STATES PATENTS

| | | |
|---|---|---|
| 689,800 | Hafermehl | Dec. 24, 1901 |
| 1,794,658 | Walsh | Mar. 3, 1931 |
| 1,900,269 | Altgelt et al. | Mar. 7, 1933 |
| 2,670,586 | Phillips | Mar. 2, 1954 |